United States Patent
Mizushima et al.

(10) Patent No.: US 11,384,243 B2
(45) Date of Patent: Jul. 12, 2022

(54) ADDITION-CURABLE SILICONE RUBBER COMPOSITION AND AIR BAG

(71) Applicant: SHIN-ETSU CHEMICAL CO., LTD., Tokyo (JP)

(72) Inventors: Hidenori Mizushima, Annaka (JP); Ryo Ashida, Annaka (JP); Shigeru Ubukata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 412 days.

(21) Appl. No.: 16/626,823

(22) PCT Filed: Jun. 6, 2018

(86) PCT No.: PCT/JP2018/021647
§ 371 (c)(1),
(2) Date: Dec. 26, 2019

(87) PCT Pub. No.: WO2019/012863
PCT Pub. Date: Jan. 17, 2019

(65) Prior Publication Data
US 2020/0157347 A1     May 21, 2020

(30) Foreign Application Priority Data

Jul. 14, 2017  (JP) .............................. JP2017-137833

(51) Int. Cl.
*B60R 21/232* (2011.01)
*B60R 21/235* (2006.01)
*C08L 83/04* (2006.01)

(52) U.S. Cl.
CPC ............ *C08L 83/04* (2013.01); *B60R 21/232* (2013.01); *B60R 21/235* (2013.01); *B60R 2021/23509* (2013.01); *C08L 2205/025* (2013.01); *C08L 2205/05* (2013.01); *C08L 2310/00* (2013.01)

(58) Field of Classification Search
CPC ........... C08L 2205/02; C08L 2205/025; C08L 2205/03; C08L 2205/035; C08L 2205/05; C08L 83/04; C09D 183/04; C09D 183/06; C09D 183/14; C08K 5/54; C08K 5/5415; C08K 5/5477; B60R 2021/23509; B60R 2021/23514; B60R 2021/23595; B60R 21/23; B60R 21/235
USPC ......... 428/447; 524/588, 861, 862; 442/104; 280/728.1
See application file for complete search history.

(56) References Cited

U.S. PATENT DOCUMENTS

| | | | |
|---|---|---|---|
| 5,093,454 A * | 3/1992 | Fujimoto | ................ C08L 83/04 528/901 |
| 5,106,933 A | 4/1992 | Kobayashi et al. | |
| 5,877,256 A | 3/1999 | Nakamura et al. | |
| 6,251,990 B1 * | 6/2001 | Meguriya | ................ C08L 83/04 524/786 |
| 6,387,520 B1 | 5/2002 | Fujiki et al. | |
| 7,534,499 B2 * | 5/2009 | Ikeno | ..................... D06N 3/128 428/447 |
| 2006/0270792 A1 * | 11/2006 | Kashiwagi | .............. H01L 23/24 524/588 |
| 2008/0021190 A1 * | 1/2008 | Yaginuma | ............ C08K 5/5455 528/33 |
| 2009/0312475 A1 | 12/2009 | Tasaki et al. | |
| 2013/0190470 A1 | 7/2013 | Marrot et al. | |
| 2013/0241088 A1 * | 9/2013 | On | ........................ H01L 23/296 523/435 |

FOREIGN PATENT DOCUMENTS

| | | |
|---|---|---|
| JP | 3-37265 A | 2/1991 |
| JP | 5-214295 A | 8/1993 |
| JP | 2001-59052 A | 3/2001 |
| JP | 2001-287610 A | 10/2001 |
| JP | 2002-138249 A | 5/2002 |
| JP | 2006-335872 A | 12/2006 |
| JP | 2006-348068 A | 12/2006 |
| JP | 2010-254107 A | 11/2010 |
| JP | 2013-527857 A | 7/2013 |

OTHER PUBLICATIONS

International Search Report (PCT/ISA/210) issued in PCT/JP2018/021647, dated Sep. 11, 2018.
Written Opinion of the International Searching Authority (PCT/ISA/237) issued in PCT/JP2018/021647, dated Sep. 11, 2018.

* cited by examiner

*Primary Examiner* — Lee E Sanderson
(74) *Attorney, Agent, or Firm* — Birch, Stewart, Kolasch & Birch, LLP

(57) ABSTRACT

An addition-curable silicone rubber composition and an air bag are provided.

The addition-curable silicone rubber composition is characterized by comprising:

(A) 100 parts by mass of an alkenyl-group-containing organopolysiloxane;

(B) an organohydrogenpolysiloxane, contained in such an amount that the number of moles of silicon-atom-bonded hydrogen atoms contained in (B) component is 5 or greater per mole of the alkenyl groups contained in (A) component;

(C) an addition reaction catalyst, contained in an amount of 1-500 ppm, in terms of the mass of the catalyst metal element, of the total mass of (A) and (B) components;

(D) 0.1-50 parts by mass of finely powdery silica;

(E) 0.1-5.0 parts by mass of an adhesion improver [a mixture comprising (E-1) an organohydrogenpolysiloxane, (E-2) an alkoxysilyl-modified isocyanurate compound, and (E-3) an organosilicon compound]; and (F) 0.1-5.0 parts by mass of a condensation catalyst.

5 Claims, No Drawings

ADDITION-CURABLE SILICONE RUBBER COMPOSITION AND AIR BAG

TECHNICAL FIELD

This invention relates to an addition-curable silicone rubber composition and airbag.

BACKGROUND ART

Heretofore, silicone rubber compositions for airbags have been proposed for forming a rubber coating on the textile surface. For example, Patent Document 1: JP-A H05-214295 discloses an airbag-forming addition-curable liquid silicone rubber composition having an inorganic filler, siloxane resin, and epoxy-containing silicon compound added thereto, which is improved in adhesion to base fabrics. Patent Document 2: JP-A 2002-138249 discloses an addition-curable liquid silicone rubber coating composition having an inorganic filler, siloxane resin, organotitanium compound, and alkyl silicate added thereto, which develops excellent adhesion to base fabrics on brief heating at low temperature. Patent Document 3: JP-A 2001-287610 describes an airbag-forming silicone rubber composition comprising a vinyl-containing organopolysiloxane having a limited range of viscosity, which is able to coat in thin film. Patent Document 4: JP-A 2001-059052 discloses a rubber coated cloth-forming coating composition comprising a rubber coating composition and wet silica added thereto, the wet silica having an average BET specific surface area of 150 to 250 m²/g and an average particle size of no more than 20 μm, which is minimized in pressure-sensitive adhesion.

Unlike the application where these compositions are used for airbags which are installed at the driver and passenger seats of vehicles, in the application where these compositions are used in the preparation of curtain airbags which are installed from the front pillar to the roof side and have to stay inflated for a certain time for protecting the head and preventing the passengers from being ejected upon collision or rollover, these compositions are unsatisfactory in preventing leakage of inflator gas and sustaining inflation for a long enough time.

PRIOR ART DOCUMENTS

Patent Documents

Patent Document 1: JP-A H05-214295
Patent Document 2: JP-A 2002-138249
Patent Document 3: JP-A 2001-287610
Patent Document 4: JP-A 2001-059052

SUMMARY OF INVENTION

Technical Problem

An object of the invention, which has been made under the above-mentioned circumstances, is to provide an addition-curable silicone rubber composition which has good physical properties such as hardness, tensile strength, and elongation at break, as well as tight adhesion to airbag base fabrics, is effective for preventing leakage of inflator gas and sustaining inflation for a long enough time, and is advantageously used for manufacturing airbags such as curtain airbags, and an airbag.

Solution to Problem

Making extensive investigations to attain the above object, the inventors have found that an addition-curable silicone rubber composition comprising (A) an alkenyl-containing organopolysiloxane, (B) an organohydrogenpolysiloxane, (C) an addition reaction catalyst, (D) finely divided silica, (E) a tackifier, i.e., a mixture of (E-1) an organohydrogenpolysiloxane, (E-2) an alkoxysilyl-modified isocyanurate compound, and (E-3) an organosilicon compound, and (F) a condensation catalyst cures into a cured product which has good physical properties such as hardness, tensile strength, and elongation at break, and tight adhesion to airbag base fabrics. When applied to airbags, especially curtain airbags, the cured product is effective for preventing leakage of inflator gas and sustaining inflation for a long enough time. The invention is predicated on this finding.

Accordingly, the invention provides an addition-curable silicone rubber composition and airbag as defined below.

[1]

An addition-curable silicone rubber composition comprising:

(A) 100 parts by weight of an organopolysiloxane having at least two silicon-bonded $C_2$-$C_8$ alkenyl groups per molecule, (B) an organohydrogenpolysiloxane having at least two silicon-bonded hydrogen atoms per molecule, represented by the following formula (1):

[Chem. 1]

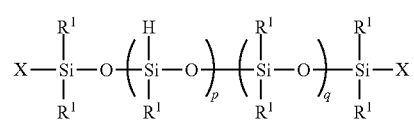

wherein $R^1$ is a $C_1$-$C_{12}$ monovalent hydrocarbon group, X is hydrogen or a group $R^1$, p is an integer of 1 to 50, q is an integer of 1 to 50, meeting $0.1 \leq p/(p+q) \leq 1$, and at least one X is hydrogen when p is 1, in an amount to give at least 5 moles of silicon-bonded hydrogen atoms in component (B) per mole of alkenyl groups in component (A), (C) an addition reaction catalyst in an amount to give 1 to 500 ppm of catalyst metal element based on the total weight of components (A) and (B), (D) 0.1 to 50 parts by weight of finely divided silica having a BET specific surface area of at least 50 m²/g, (E) 0.1 to 5.0 parts by weight of a tackifier which is a mixture of (E-1) 1 to 50% by weight of an organohydrogenpolysiloxane having the following formula (2):

[Chem. 2]

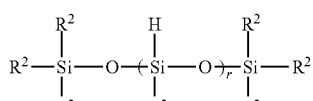

wherein $R^2$ is independently a $C_1$-$C_{12}$ monovalent hydrocarbon group and r is an integer of 5 to 50, (E-2) 1 to 50% by weight of an alkoxysilyl-modified isocyanurate compound having the following formula (3):

[Chem. 3]

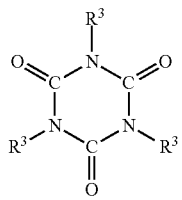
(3)

wherein $R^3$ is independently an allyl group or a group having the following formula (4):

[Chem. 4]

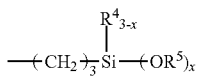
(4)

wherein $R^4$ is a $C_1$-$C_6$ monovalent hydrocarbon group, $R^5$ is a $C_1$-$C_4$ alkyl group, and x is 2 or 3, and at least two of $R^3$ are groups of formula (4), and (E-3) 40 to 90% by weight of an organosilicon compound having at least one epoxy group and at least one alkoxysilyl group per molecule and free of silicon-bonded hydrogen atoms, the total of components (E-1) to (E-3) being 100% by weight, and (F) 0.1 to 5.0 parts by weight of a condensation catalyst comprising at least one organometal compound selected from organotitanium and organozirconium compounds.

[2]

The addition-curable silicone rubber composition of [1] wherein component (A) comprises:

(A-1) an alkenyl-containing organopolysiloxane containing at least two silicon-bonded $C_2$-$C_8$ alkenyl groups per molecule and having a viscosity of at least 70,000 mPa·s at 25° C. as measured according to JIS Z-8803: 2011 and (A-2) an alkenyl-containing organopolysiloxane containing at least two silicon-bonded $C_2$-$C_8$ alkenyl groups per molecule and having a viscosity of 10,000 to 50,000 mPa·s at 25° C. as measured according to JIS Z-8803: 2011, in a weight ratio of component (A-1) to component (A-2) of from 10:90 to 90:10.

[3]

The addition-curable silicone rubber composition of [1] or [2] which cures under heat curing conditions of 150° C. and 5 minutes into a cured product having an elongation at break of at least 1,000% as measured according to JIS K-6249: 2003.

[4]

An airbag comprising a base fabric and a cured film of the addition-curable silicone rubber composition of [1] or [2] coated on the surface of the base fabric in a coating weight of 10 to 150 g/m².

[5]

The airbag of [4] which is used as a curtain airbag.

Advantageous Effects of Invention

The addition-curable silicone rubber composition of the invention has good physical properties such as hardness, tensile strength, and elongation at break as well as tight adhesion to airbag base fabrics. The composition is advantageously used for manufacturing airbags such as curtain airbags because it is effective for preventing leakage of inflator gas and sustaining inflation for a long enough time. An airbag having these advantages is also provided.

DESCRIPTION OF EMBODIMENTS

<Addition-Curable Silicone Rubber Composition>

The invention is directed to an addition-curable silicone rubber composition which comprises the following components (A) to (F) and is liquid at room temperature (25° C.). The components are described below in detail. Notably, the viscosity is measured at 25° C. by a rotational viscometer according to JIS Z-8803: 2011.

(A) Alkenyl-Containing Organopolysiloxane

Component (A), which is a main component of the composition, is an organopolysiloxane containing on average at least two, preferably on average at maximum 20, more preferably on average at maximum 10 silicon-bonded alkenyl groups per molecule.

The silicon-bonded alkenyl group typically has 2 to 8 carbon atoms, preferably 2 to 4 carbon atoms. Examples include vinyl, allyl, propenyl, butenyl, pentenyl, hexenyl, cyclohexenyl, and heptenyl, with vinyl being preferred. In the molecule of the organopolysiloxane as component (A), the silicon-bonded alkenyl group may be attached to the end of the molecular chain and/or non-terminal positions of the molecular chain (i.e., side chains from the molecular chain other than the end of the molecular chain).

The silicon-bonded organic group other than the silicon-bonded alkenyl group is a substituted or unsubstituted monovalent hydrocarbon group free of aliphatic unsaturation, typically having 1 to 12 carbon atoms, preferably 1 to 10 carbon atoms. Examples thereof include alkyl groups such as methyl, ethyl, propyl, isopropyl, isobutyl, tert-butyl, butyl, pentyl, hexyl, and heptyl; cycloalkyl groups such as cyclopentyl and cyclohexyl; aryl groups such as phenyl, tolyl, xylyl, and naphthyl; aralkyl groups such as benzyl and phenethyl; and substituted forms of these functional groups in which some hydrogen atoms are substituted by halogen (e.g., chlorine and fluorine), such as haloalkyl groups, e.g., chloromethyl, 3-chloropropyl, and 3,3,3-trifluoropropyl. Methyl and phenyl are preferred.

The content of silicon-bonded alkenyl groups in component (A) is typically 0.001 to 10 mol %, preferably 0.01 to 5 mol % of the entire silicon-bonded organic groups.

The molecular structure of the organopolysiloxane (A) is not particularly limited and may be a linear, cyclic or branched. It is preferably a linear diorganopolysiloxane having a backbone consisting essentially of repeating $R_2SiO_{2/2}$ units (diorganosiloxane units, wherein R is a monovalent hydrocarbon group) and capped with $R_3SiO_{1/2}$ units (triorganosiloxy units, wherein R is as defined above) at both ends of the molecular chain. As used herein, the term "a backbone consisting essentially of repeating $R_2SiO_{2/2}$ units" means that the $R_2SiO_{2/2}$ units typically account for 99 to 100 mol %, preferably 99.5 to 100 mol % of siloxane units of the backbone section excluding the molecular both ends.

In the formula, R is a monovalent hydrocarbon group which typically has 1 to 12 carbon atoms, preferably 1 to 10 carbon atoms. Examples include those exemplified above for the silicon-bonded alkenyl group and those exemplified above for the silicon-bonded organic group other than the silicon-bonded alkenyl group.

The organopolysiloxane (A) preferably has a viscosity of 100 to 500,000 mPa·s, more preferably 10,000 to 200,000 mPa·s, in consideration of good physical properties such as hardness, elongation at break, and tear strength of the cured composition and ease of handling or working of the composition.

The organopolysiloxane (A) preferably has the following average compositional formula (5).

[Chem. 5]

Herein $R^2$ is a $C_1$-$C_{12}$ alkyl group or $C_6$-$C_{12}$ aryl group, $R^3$ is independently a $C_2$-$C_8$ alkenyl group, "a" is a positive number of 1.8 to 2.2, preferably 1.9 to 2.0, b is a positive number of 0.0001 to 0.2, preferably 0.001 to 0.1, and a+b is a positive number of 1.85 to 2.3, preferably 1.95 to 2.05.

In formula (5), $R^2$ is a group selected from $C_1$-$C_{12}$, preferably $C_1$-$C_{10}$ alkyl groups and $C_6$-$C_{12}$, preferably $C_6$-$C_{10}$ aryl groups, examples of which are those exemplified above for the silicon-bonded organic group other than the silicon-bonded alkenyl group.

In formula (5), $R^3$ is an alkenyl group which typically has 2 to 8 carbon atoms, preferably 2 to 4 carbon atoms. Examples are those exemplified above for the silicon-bonded alkenyl group.

Examples of the organopolysiloxane as component (A) include
molecular both end trimethylsiloxy-capped dimethylsiloxane/methylvinylsiloxane copolymers,
molecular both end trimethylsiloxy-capped methylvinylpolysiloxane,
molecular both end trimethylsiloxy-capped dimethylsiloxane/methylvinylsiloxane/-methylphenylsiloxane copolymers,
molecular both end dimethylvinylsiloxy-capped dimethylpolysiloxane,
molecular both end dimethylvinylsiloxy-capped methylvinylpolysiloxane,
molecular both end dimethylvinylsiloxy-capped dimethylsiloxane/methylvinylsiloxane copolymers,
molecular both end dimethylvinylsiloxy-capped dimethylsiloxane/methylvinylsiloxane/-methylphenylsiloxane copolymers,
molecular both end divinylmethylsiloxy-capped dimethylpolysiloxane,
molecular both end divinylmethylsiloxy-capped dimethylsiloxane/methylvinylsiloxane copolymers,
molecular both end trivinylsiloxy-capped dimethylpolysiloxane,
molecular both end trivinylsiloxy-capped dimethylsiloxane/methylvinylsiloxane copolymers, organosiloxane copolymers consisting of siloxane units of the formula: $R^2_3SiO_{0.5}$ (wherein $R^2$ is as defined above), siloxane units of the formula: $R^2_2R^3SiO_{0.5}$ (wherein $R^3$ is as defined above), siloxane units of the formula: $R^2_2SiO$, and siloxane units of the formula: $SiO_2$, organosiloxane copolymers consisting of siloxane units of the formula: $R^2_3SiO_{0.5}$, siloxane units of the formula: $R^2_2R^3SiO_{0.5}$, and siloxane units of the formula: $SiO_2$, organosiloxane copolymers consisting of siloxane units of the formula: $R^2_2R^3SiO_{0.5}$, siloxane units of the formula: $R^2_2SiO$, and siloxane units of the formula: $SiO_2$, and organosiloxane copolymers consisting of siloxane units of the formula: $R^2R^3SiO$ and siloxane units of the formula: $R^2SiO_{1.5}$ or siloxane units of the formula: $R^3SiO_{1.5}$.

The organopolysiloxane as component (A) may be used alone or in admixture.

When used in admixture, component (A) preferably contains (A-1) an alkenyl-containing organopolysiloxane containing at least two $C_2$-$C_8$ alkenyl groups per molecule and having a viscosity at 25° C. of at least 70,000 mPa·s, preferably 80,000 to 120,000 mPa·s as measured according to JIS Z-8803: 2011 and (A-2) an alkenyl-containing organopolysiloxane containing at least two $C_2$-$C_8$ alkenyl groups per molecule and having a viscosity at 25° C. of 10,000 to 50,000 mPa·s, preferably 20,000 to 40,000 mPa·s as measured according to JIS Z-8803: 2011.

Component (A-1) and component (A-2) are preferably combined in a weight ratio (A-1):(A-2) of from 10:90 to 90:10. A ratio within the range ensures to suppress leakage of an inflator gas and to sustain inflation for a long enough time.

(B) Organohydrogenpolysiloxane

Component (B) is an organohydrogenpolysiloxane which is an essential crosslinker for curing the composition and forming cured silicone rubber having a practically sufficient strength through the mechanism that hydrosilylation addition reaction takes place between silicon-bonded hydrogen atoms (or SiH groups) in its molecule and alkenyl groups in component (A) to form a crosslinking structure. The organohydrogenpolysiloxane has the following general formula (1).

[Chem. 6]

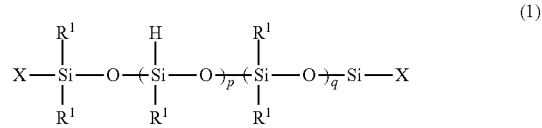

Herein $R^1$ which may be the same or different is a substituted or unsubstituted monovalent hydrocarbon group free of aliphatic unsaturation, X is independently hydrogen or $R^1$, p is an integer of 1 to 50, q is an integer of 1 to 50, t=p/(p+q) satisfies $0.1 \le t \le 1$, and at least one X is hydrogen when p=1.

In formula (1), $R^1$ which may be the same or different is a substituted or unsubstituted $C_1$-$C_{12}$, preferably $C_1$-$C_8$ monovalent hydrocarbon group free of aliphatic unsaturation. Examples of $R^1$ include alkyl groups such as methyl, ethyl, propyl, isopropyl, butyl, isobutyl, tert-butyl, hexyl, octyl, and decyl; aryl groups such as phenyl, tolyl, xylyl, and naphthyl; cycloalkyl groups such as cyclohexyl; aralkyl groups such as benzyl and phenylethyl; halo-substituted hydrocarbon groups such as chloromethyl, bromoethyl, and trifluoropropyl; and cyano-substituted hydrocarbon groups such as cyanoethyl. Of these, methyl and phenyl are preferred. Those organohydrogenpolysiloxanes of formula (1) wherein all groups $R^1$ are methyl or phenyl and wherein some groups $R^1$ are methyl and the remainder are phenyl are readily synthesized and chemically stable.

In formula (1), p is an integer of 1 to 50, preferably 2 to 25, more preferably 3 to 25, and most preferably 5 to 20, q is an integer of 1 to 50, preferably 1 to 30, more preferably 5 to 25, satisfying $0.1 \le t \le 1$, preferably $0.2 \le t \le 0.5$. At least one X is hydrogen when p=1.

Examples of the organohydrogenpolysiloxane as component (B) include
both end trimethylsiloxy-capped methylhydrogenpolysiloxane,
both end trimethylsiloxy-capped dimethylsiloxane/methylhydrogensiloxane copolymers,
both end dimethylhydrogensiloxy-capped methylhydrogenpolysiloxane,
both end dimethylhydrogensiloxy-capped dimethylsiloxane/methylhydrogensiloxane copolymers, both end trimethylsiloxy-capped methylhydrogensiloxane/ diphenylsiloxane copolymers,
both end trimethylsiloxy-capped methylhydrogensiloxane/ diphenylsiloxane/dimethylsiloxane copolymers,
both end trimethylsiloxy-capped methylhydrogensiloxane/ methylphenylsiloxane copolymers,
both end trimethylsiloxy-capped methylhydrogensiloxane/ methylphenylsiloxane/-dimethylsiloxane copolymers,
both end dimethylhydrogensiloxy-capped methylhydrogensiloxane/diphenylsiloxane copolymers,
both end dimethylhydrogensiloxy-capped methylhydrogensiloxane/methylphenylsiloxane copolymers,
both end dimethylhydrogensiloxy-capped methylhydrogensiloxane/dimethylsiloxane/-diphenylsiloxane copolymers, and
both end dimethylhydrogensiloxy-capped methylhydrogensiloxane/dimethylsiloxane/-methylphenylsiloxane copolymers
as long as they satisfy the requirements of formula (1).

The organohydrogenpolysiloxane of formula (1) may be used alone or in admixture.

The organohydrogenpolysiloxane of formula (1) preferably has a viscosity at 25° C. of 1 to 500 mPa·s, more preferably 5 to 100 mPa·s as measured according to JIS Z-8803: 2011.

Component (B) is typically blended in an amount to give at least 5 moles, preferably 5 to 10 moles, more preferably 5 to 7 moles of silicon-bonded hydrogen atoms in component (B) per mole of silicon-bonded alkenyl groups in component (A). If component (B) is blended in an amount to give less than 5 moles of silicon-bonded hydrogen atoms in component (B) per mole of silicon-bonded alkenyl groups in component (A), the resulting composition may have insufficient elongation at break. If component (B) is blended in an amount to give more than 10 moles of silicon-bonded hydrogen atoms in component (B) per mole of silicon-bonded alkenyl groups in component (A), the resulting silicone rubber may have extremely low heat resistance.

Specifically, the amount of component (B) blended is 1 to 30 parts, preferably 2 to 20 parts by weight per 100 parts by weight of the organopolysiloxane as component (A).

(C) Addition Reaction Catalyst

Component (C) is an addition reaction catalyst for promoting addition reaction between silicon-bonded alkenyl groups in component (A) and SiH groups in component (B). The addition reaction catalyst is not particularly limited. Examples include platinum group metals such as platinum, palladium, and rhodium and platinum group metal compounds such as chloroplatinic acids, alcohol-modified chloroplatinic acids, coordination compounds of chloroplatinic acid with olefin, vinylsiloxane, and acetylene compounds, tetrakis(triphenylphosphine)palladium, and chlorotris(triphenylphosphine)rhodium. Of these, the platinum group metal compounds are preferred.

Component (C) is blended in a catalytic or effective amount. Specifically, component (C) is preferably used in an amount to give 1 to 500 ppm, more preferably 10 to 100 ppm of catalyst metal element based on the total weight of components (A) and (B). If the amount of component (C) is too small, addition reaction may be substantially retarded or the composition may not cure. Too much amounts of component (C) may result in a cured product having less heat resistance.

The addition reaction catalyst (C) may be used alone or in admixture.

(D) Finely Divided Silica

Component (D) is finely divided silica which serves as a reinforcing material for imparting high tear strength to the cured product so that coating films having excellent tear strength may be formed. The finely divided silica must have a BET specific surface area of at least 50 m²/g, preferably 50 to 400 m²/g, and more preferably 100 to 300 m²/g.

Silica with a specific surface area of less than 50 m²/g may fail to impart sufficient tear strength to the cured composition.

The finely divided silica (D) may be any of conventional well-known silica species used as reinforcing filler in silicone rubber as long as the BET specific surface area falls within the range. Examples include precipitated silica, fumed silica, and pyrogenic silica. While finely divided silica may be used as such, the silica is preferably surface treated with an organosilicon compound into hydrophobic silica prior to use, for imparting good fluidity to the composition. Examples of the organosilicon compound include hexaorganodisilazanes such as hexamethyldisilazane, divinyltetramethyldisilazane, and dimethyltetravinyldisilazane; alkoxysilanes such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, and divinyldimethoxysilane; methylchlorosilanes such as trimethylchlorosilane, dimethyldichlorosilane, and methyltrichlorosilane; and dimethylpolysiloxane having neither silicon-bonded alkenyl groups nor silicon-bonded hydrogen atoms.

The amount of component (D) blended is 0.1 to 50 parts, preferably 1 to 50 parts, and more preferably 5 to 40 parts by weight per 100 parts by weight of the organopolysiloxane as component (A). Too small amounts of component (D) may fail to impart satisfactory tear strength. With too much amounts of component (D), the composition may lose fluidity and become ineffective in coating operation.

The finely divided silica (D) may be used alone or in admixture.

(E) Tackifier

Component (E) is a tackifier for improving the adhesion of the composition to airbag base materials such as woven synthetic fiber, non-woven fabrics, and thermoplastic resin sheets or films. The tackifier can improve the self-bonding ability of the composition and is characterized by the combined use of the following components (E-1) to (E-3): organohydrogenpolysiloxane, alkoxysilyl-modified isocyanurate compound, and organosilicon compound.

Notably, the total of components (E-1) to (E-3) is 100% by weight.

(E-1) Organohydrogenpolysiloxane

Component (E-1) is an organohydrogenpolysiloxane consisting of organosiloxy groups having pendant hydrogen and terminal triorganosiloxy groups, represented by the following formula (2).

[Chem. 7]

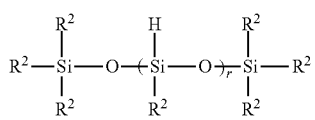

(2)

Herein R² is independently a $C_1$-$C_{12}$ monovalent hydrocarbon group, examples of which are those exemplified above for R¹, and r is an integer of 5 to 50, preferably 10 to 40. Component (E-1) accounts for 1 to 50% by weight, preferably 5 to 30% by weight of the total amount of component (E) blended.

In the invention, the amount of silicon-bonded hydrogen atoms in component (E-1) is extremely smaller than the amount of silicon-bonded hydrogen atoms in component (B). It is believed that the majority of silicon-bonded hydrogen atoms in component (E-1) are used for imparting adhesion to the composition and only a fraction are subject to crosslinking reaction with component (A). Therefore, the amount of silicon-bonded hydrogen atoms in component (E-1) need not be taken into account when the ratio of silicon-bonded hydrogen atoms in component (B) to alkenyl groups in component (A) is calculated for determining the amount of component (B) to be blended.

(E-2) Alkoxysilyl-Modified Isocyanurate Compound

Component (E-2) is an alkoxysilyl-modified isocyanurate compound having the following formula (3).

[Chem. 8]

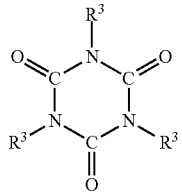

(3)

Herein $R^3$ is independently allyl or a group having the following formula (4):

[Chem. 9]

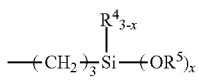

(4)

wherein $R^4$ is a $C_1$-$C_6$ monovalent hydrocarbon group, preferably methyl or ethyl, $R^5$ is a $C_1$-$C_4$ alkyl group, preferably methyl, and x is 2 or 3, preferably 3, and at least 2, preferably all 3 of $R^3$ are groups of formula (4). Component (E-2) accounts for 1 to 50% by weight, preferably 5 to 30% by weight of the total amount of component (E) blended.

In the invention, when component (E-2) has an allyl group, the amount of allyl in component (E-2) is extremely smaller than the amount of alkenyl groups in component (A). It is believed that the allyl group in component (E-2) is used mainly for imparting adhesion to the composition and only slightly for crosslinking reaction with component (B). Therefore, the amount of allyl in component (E-2) need not be taken into account when the ratio of silicon-bonded hydrogen atoms in component (B) to alkenyl groups in component (A) is calculated for determining the amount of component (B) to be blended.

(E-3) Organosilicon Compound

Component (E-3) is an organosilicon compound having at least one, preferably 1 to 10 epoxy groups and at least one, preferably 1 to 10 alkoxysilyl groups per molecule and free of silicon-bonded hydrogen atoms. Suitable epoxy groups include 2,3-epoxypropyl, 3-glycidoxypropyl, and 2-(3,4-epoxycyclohexyl)ethyl, with 3-glycidoxypropyl being preferred. Suitable alkoxysilyl groups include trimethoxysilyl, triethoxysilyl, methyldimethoxysilyl, and methyldiethoxysilyl, with trimethoxysilyl being preferred. Component (E-3) accounts for 40 to 90% by weight, preferably 50 to 80% by weight of the total amount of component (E) blended.

Examples of component (E) are shown below.

[Chem. 10]

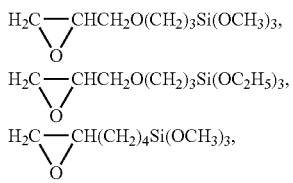

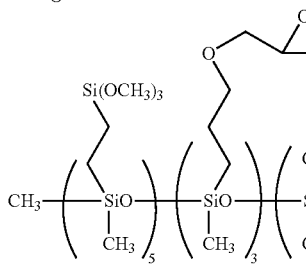

The amount of component (E) blended, i.e., total amount of components (E-1) to (E-3) is 0.1 to 5.0 parts, preferably 0.1 to 2.0 parts by weight per 100 parts by weight of the organopolysiloxane as component (A). If the amount of component (E) is too small, the resulting composition may have insufficient bonding force. Too much amounts of component (E) may be uneconomical because of an increased cost.

(F) Condensation Catalyst

Component (F) is a condensation catalyst which is at least one compound selected from organotitanium compounds and organozirconium compounds and serves as a condensation co-catalyst for adhesion-promoting component (E). Component (F) may be used alone or in admixture. Examples of component (F) include titanium-based condensation co-catalysts (titanium compounds), for instance, organic titanates such as titanium tetraisopropoxide, titanium tetra-n-butoxide, and titanium tetra-2-ethylhexoxide and organotitanium chelate compounds such as titanium diisopropoxybis(acetylacetonate), titanium diisopropoxybis (ethylacetoacetate), and titanium tetraacetylacetonate and zirconium-based condensation co-catalysts (zirconium compounds), for instance, organozirconium esters such as zirconium tetra-n-propoxide and zirconium tetra-n-butoxide and organozirconium chelate compounds such as zirconium tributoxymonoacetylacetonate, zirconium monobutoxyacetylacetonate-bis(ethylacetoacetate), and zirconium tetraacetyl acetonate.

The amount of component (F) blended should be 0.1 to 5.0 parts, preferably 0.2 to 2.0 parts by weight per 100 parts by weight of component (A). If the amount of component (F) is less than 0.1 part by weight, the cured product may have less adhesion durability under hot humid conditions. If the amount of component (F) exceeds 5.0 parts by weight, the cured product may tend to lose heat resistance.

Other Components

Besides components (A) to (F), optional other components may be blended in the composition as long as the objects of the invention are not impaired. Suitable other components are shown below while each component may be used alone or in admixture.

Organosilicon Compound

Examples of an organosilicon compound other than component (E-3) are shown below.

[Chem. 11]

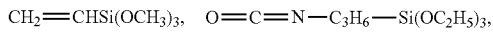

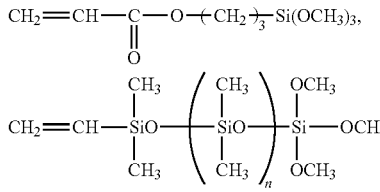

Herein n is an integer of 1 to 98.

The amount of the other organosilicon compound blended is 0 to 3 parts, preferably 0 to 1 part by weight per 100 parts by weight of the organopolysiloxane as component (A).

Reaction Inhibitor

A reaction inhibitor is not particularly limited as long as it is a compound that exerts a cure reaction inhibitory effect to the addition reaction catalyst as component (C). The inhibitor may be selected from conventional well-known reaction inhibitors. Examples include phosphorus-containing compounds such as triphenylphosphine; nitrogen-containing compounds such as tributylamine, tetramethylethylenediamine, and benzotriazole; sulfur-containing compounds; acetylene compounds such as acetylene alcohols; compounds containing at least two alkenyl groups; hydroperoxy compounds; and maleic acid derivatives. Since the extent of the cure reaction inhibitory effect of the reaction inhibitor varies with the chemical structure of the inhibitor, it is preferred to adjust the amount of reaction inhibitor to be optimum whenever a particular reaction inhibitor is selected. When an optimum amount of the reaction inhibitor is added, the composition remains stable during long-term shelf storage at room temperature and is still effectively curable.

Inorganic or Organic Filler

In addition to the finely divided silica (D) such as precipitated silica, fumed silica or pyrogenic silica, the inventive composition may further comprise an inorganic or organic filler as shown below. Examples include inorganic fillers such as crystalline silica, hollow fillers, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fibers; the foregoing fillers which have been surface treated to be hydrophobic with organosilicon compounds such as organoalkoxysilane compounds, organochlorosilane compounds, organosilazane compounds, and low-molecular-weight siloxane compounds; and organic fillers such as silicone rubber powder and silicone resin powder.

The composition may further comprise organopolysiloxanes having neither silicon-bonded hydrogen atoms nor silicon-bonded alkenyl groups, solvents such as water and organic solvents, crepe hardening inhibitors, plasticizer, thixotropic agents, pigments, dyes, and mildew-proofing agents.

Preparation of Addition-Curable Silicone Rubber Composition

The liquid addition-curable silicone rubber composition may be prepared by combining the above-described components (A) to (F) and other optional components and intimately mixing them.

The addition-curable silicone rubber composition preferably has a viscosity at 25° C. of 10,000 to 500,000 mPa·s, more preferably 30,000 to 300,000 mPa·s as measured according to JIS K-6249: 2003. Within this range of viscosity, the composition is advantageously used in coating an airbag base fabric therewith because of the unlikelihood of uneven coating and adhesion failure after curing.

<Airbag>

The inventive composition is used in airbags, especially curtain airbags.

Typically, the airbag base fabric (i.e., base material of fiber cloth) may be any of well-known fabrics. Examples include woven fabrics made of synthetic fibers, for example, various types of polyamide fibers such as nylon 66, nylon 6, and aramid fibers and various types of polyester fibers such as polyethylene terephthalate (PET) and polybutylene terephthalate (PBT).

By coating the addition-curable silicone rubber composition to at least one surface of such an airbag base fabric and heat curing the composition in a drying oven, a silicone rubber coating layer (i.e., cured composition layer) is formed on the base fabric.

An airbag having a silicone rubber coating layer formed on a base fabric may be prepared by first forming a silicone rubber coating layer on a plain-woven base fabric and then processing the fabric into a hollow-weave shape. Alternatively, the airbag may be prepared by first processing a plain-woven base fabric into a hollow-weave shape and then forming a silicone rubber coating layer on the fabric. Any of well-known bonding and stitching methods may be used in the processing to a hollow-weave shape.

In the airbag preparation, a conventional method may be used in coating the inventive composition onto the base fabric. The thickness of a coating layer (or surface coating weight) is typically about 10 to 150 g/m², preferably about 15 to 80 g/m², and most preferably about 20 to 60 g/m² in the dry state. Typical heat curing conditions for the composition include a temperature of 120 to 200° C., preferably 150 to 200° C. and a time of 1 to 10 minutes, preferably 1 to 3 minutes.

The cured product obtained by heat curing at 150° C. for 5 minutes preferably has an elongation at break of at least 1,000%, more preferably 1,000 to 1,500% as measured according to JIS K-6249: 2003. When the elongation at break falls within the range, leakage of an inflator gas is suppressed and the inflation is sustained for a longer time.

EXAMPLES

Examples and Comparative Examples are given below for further illustrating the invention although the invention is not limited thereto. It is noted that all parts are by weight and the viscosity is measured at 25° C. according to JIS Z-8803: 2011.

Example 1

In a kneader, 60 parts of a molecular both end vinyldimethylsiloxy-capped dimethylpolysiloxane having a viscosity of ~30,000 mPa·s was mixed with 8 parts of hexamethyldisiloxane, 2 parts of water, and 40 parts of finely divided silica having a BET specific surface area of ~300 m²/g (trade name Aerosil 300 by Nippon Aerosil Co., Ltd.) for 1 hour. After the temperature in the kneader was elevated to 150° C., mixing was continued for 2 hours. After the temperature was lowered to 100° C., 30 parts of a molecular both end vinyldimethylsiloxy-capped dimethylpolysiloxane having a viscosity of ~30,000 mPa·s was added to the mixture, which were mixed until uniform, yielding a base compound (I).

Composition 1 was prepared by mixing 90 parts of base compound (I) with 83.0 parts of a molecular both end vinyldimethylsiloxy-capped dimethylpolysiloxane having a viscosity of ~100,000 mPa·s, 8.5 parts of the following Compound 1, i.e., a molecular both end trimethylsiloxy-capped dimethylsiloxane/methylhydrogensiloxane copolymer containing silicon-bonded hydrogen atoms at non-terminal positions of the molecular chain (silicon-bonded hydrogen content=0.31 wt %) and having a viscosity of 20 mPa·s, 0.10 part of the following Compound 2, i.e., a molecular both end trimethylsiloxy-capped methylhydrogensiloxane copolymer containing silicon-bonded hydrogen atoms as molecular chain pendants (silicon-bonded hydrogen content=1.08 wt %) and having a viscosity of 45 mPa·s, 0.25 part of the following Compound 3, i.e., an alkoxysilyl-modified isocyanurate compound, 0.90 part of the following Compound 4, i.e., γ-glycidoxypropyltrimethoxysilane, 0.07 part of 1-ethynylcyclohexanol, 0.20 part of a dimethylpolysiloxane solution containing chloroplatinic acid/1,3-divinyltetramethyldisiloxane complex in a platinum content of 1 wt %, and 0.26 part of zirconium tetraacetylacetonate.

[Chem.12]

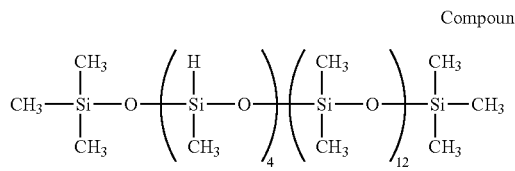

Compound 1

[Chem.13]

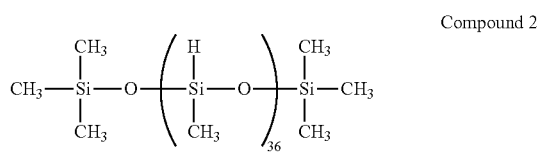

Compound 2

[Chem.14]

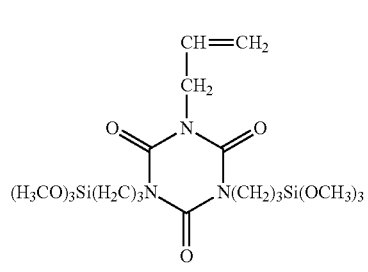

Compound 3

[Chem.15]

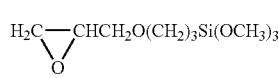

Compound 4

In Composition 1, the content of silicon-bonded hydrogen atoms in component (B) was 6 moles per mole of silicon-bonded alkenyl groups in component (A).

The results are shown in Table 1 together with H/V. As used herein, the term "H/V" refers to a molar ratio of silicon-bonded hydrogen atoms in component (B) to silicon-bonded alkenyl groups in component (A).

Composition 1 was heat cured at 150° C. for 5 minutes into a cured product, from which a test sheet was prepared and measured for hardness, tensile strength, and elongation at break according to JIS K-6249: 2003.

Composition 1 was coated onto a hollow-weave airbag nylon 66 base fabric (210 deniers) by means of a coater in the minimum amount (50 g/m²) of composition necessary to achieve an even and uniform coat, and heat cured in an oven at 200° C. for one minute, forming a hollow-weave airbag. An airtightness test was carried out on the resulting airbag. In the airtightness test, once the airbag was inflated at a pressure of 100 kPa, the residual pressure after 30 seconds was measured. Airtightness was evaluated from this value.

<Scott Type Crease-Flex Test>

The composition was coated onto an airbag nylon 66 base fabric (210 deniers) in a coating weight of 50 g/m² and heated at 200° C. for one minute. The coated base fabric was subjected to a Scott type crease-flex test.

The Scott type crease-flex test was performed according to JIS K-6404-6: 1999, using a Scott type crease-flex tester (Apparatus: Scott type folding and abrasion tester, Toyo Seiki Seisaku-sho, Ltd.). The silicone rubber-coated nylon base fabric was subjected to 500 cycles of Scott type crease-flex test under a pressure load of 19.6 N, after which the breaking state of the coated portion was visually observed. The test sample was rated "pass" when the silicone rubber-coating layer did not peel off the fabric surface and "reject" when the layer peeled off the fabric surface.

Example 2

Composition 2 was prepared by mixing 90 parts of base compound (I) in Example 1 with 83.0 parts of a molecular both end vinyldimethylsiloxy-capped dimethylpolysiloxane having a viscosity of ~100,000 mPa·s, 17.0 parts of the following Compound 5, i.e., a molecular both end trimethylsiloxy-capped methylhydrogensiloxane copolymer containing silicon-bonded hydrogen atoms at non-terminal positions of the molecular chain (silicon-bonded hydrogen content=0.15 wt %) and having a viscosity of 25 mPa·s, 0.10 part of Compound 2, i.e., a molecular both end trimethylsiloxy-capped dimethylsiloxane/methylhydrogensiloxane copolymer containing silicon-bonded hydrogen atoms as molecular chain pendants (silicon-bonded hydrogen content=1.08 wt %) and having a viscosity of 45 mPa·s, 0.25 part of Compound 3, i.e., an alkoxysilyl-modified isocyanurate compound, 0.90 part of Compound 4, i.e., γ-glycidoxypropyltrimethoxysilane, 0.07 part of 1-ethynylcyclohexanol, 0.20 part of a dimethylpolysiloxane solution containing chloroplatinic acid/1,3-divinyltetramethyldisiloxane complex in a platinum content of 1 wt %, and 0.26 part of zirconium tetraacetylacetonate.

[Chem.16]

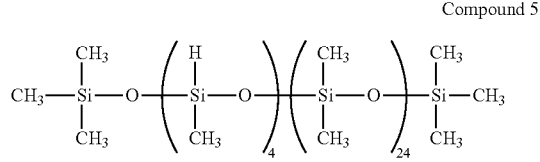

Compound 5

In Composition 2, the content of silicon-bonded hydrogen atoms in component (B) was 6 moles per mole of silicon-bonded alkenyl groups in component (A).

As in Example 1, a test sheet, hollow-weave airbag and coated base fabric were prepared and tested. The results are shown in Table 1.

Comparative Example 1

Composition 3 was prepared by mixing 90 parts of base compound (I) in Example 1 with 83.0 parts of a molecular both end vinyldimethylsiloxy-capped dimethylpolysiloxane having a viscosity of ~100,000 mPa·s, 4.2 parts of Compound 1, i.e., a molecular both end trimethylsiloxy-capped methylhydrogensiloxane copolymer containing silicon-bonded hydrogen atoms at non-terminal positions of the molecular chain (silicon-bonded hydrogen content=0.31 wt %) and having a viscosity of 20 mPa·s, 0.10 part of Compound 2, i.e., a molecular both end trimethylsiloxy-capped dimethylsiloxane/methylhydrogensiloxane copolymer containing silicon-bonded hydrogen atoms as molecular chain pendants (silicon-bonded hydrogen content=1.08 wt %) and having a viscosity of 45 mPa·s, 0.25 part of Compound 3, i.e., an alkoxysilyl-modified isocyanurate compound, 0.90 part of Compound 4, i.e., γ-glycidoxypropyltrimethoxysilane, 0.07 part of 1-ethynylcyclohexanol, 0.20 part of a dimethylpolysiloxane solution containing chloroplatinic acid/1,3-divinyltetramethyldisiloxane complex in a platinum content of 1 wt %, and 0.26 part of zirconium tetraacetylacetonate.

In Composition 3, the content of silicon-bonded hydrogen atoms in component (B) was 3 moles per mole of silicon-bonded alkenyl groups in component (A).

As in Example 1, a test sheet, hollow-weave airbag and coated base fabric were prepared and tested. The results are shown in Table 1.

Comparative Example 2

Composition 4 was prepared by mixing 90 parts of base compound (I) in Example 1 with 83.0 parts of a molecular both end vinyldimethylsiloxy-capped dimethylpolysiloxane having a viscosity of ~100,000 mPa·s, 8.5 parts of Compound 1, i.e., a molecular both end trimethylsiloxy-capped dimethylsiloxane/methylhydrogensiloxane copolymer containing silicon-bonded hydrogen atoms at non-terminal positions of the molecular chain (silicon-bonded hydrogen content=0.31 wt %) and having a viscosity of 20 mPa·s, 0.25 part of Compound 3, i.e., an alkoxysilyl-modified isocyanurate compound, 0.90 part of Compound 4, i.e., γ-glycidoxypropyltrimethoxysilane, 0.07 part of 1-ethynylcyclohexanol, 0.20 part of a dimethylpolysiloxane solution containing chloroplatinic acid/1,3-divinyltetramethyldisiloxane complex in a platinum content of 1 wt %, and 0.26 part of zirconium tetraacetylacetonate.

In Composition 4, the content of silicon-bonded hydrogen atoms in component (B) was 6 moles per mole of silicon-bonded alkenyl groups in component (A).

As in Example 1, a test sheet, hollow-weave airbag and coated base fabric were prepared and tested. The results are shown in Table 1.

Comparative Example 3

Composition 5 was prepared by mixing 90 parts of base compound (I) in Example 1 with 83.0 parts of a molecular both end vinyldimethylsiloxy-capped dimethylpolysiloxane having a viscosity of ~100,000 mPa·s, 8.5 parts of Compound 1, i.e., a molecular both end trimethylsiloxy-capped methylhydrogensiloxane copolymer containing silicon-bonded hydrogen atoms at non-terminal positions of the molecular chain (silicon-bonded hydrogen content=0.31 wt %) and having a viscosity of 20 mPa·s, 0.10 part of Compound 2, i.e., a molecular both end trimethylsiloxy-capped dimethylsiloxane/methylhydrogensiloxane copolymer containing silicon-bonded hydrogen atoms as molecular chain pendants (silicon-bonded hydrogen content=1.08 wt %) and having a viscosity of 45 mPa·s, 0.25 part of Compound 3, i.e., an alkoxysilyl-modified isocyanurate compound, 0.90 part of the following Compound 6, i.e., 3-isocyanatopropyltriethoxysilane, 0.07 part of 1-ethynylcyclohexanol, 0.20 part of a dimethylpolysiloxane solution containing chloroplatinic acid/1,3-divinyltetramethyldisiloxane complex in a platinum content of 1 wt %, and 0.26 part of zirconium tetraacetylacetonate.

Compound 6:

[Chem. 17]

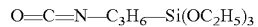

$O=C=N-C_3H_6-Si(OC_2H_5)_3$

In Composition 5, the content of silicon-bonded hydrogen atoms in component (B) was 6 moles per mole of silicon-bonded alkenyl groups in component (A).

As in Example 1, a test sheet, hollow-weave airbag and coated base fabric were prepared and tested. The results are shown in Table 1.

TABLE 1

|  | Example | | Comparative Example | | |
|---|---|---|---|---|---|
|  | 1 | 2 | 1 | 2 | 3 |
| Hardness (Durometer type A) | 10 | 8 | 13 | 10 | 9 |
| Tensile strength (MPa) | 4.0 | 3.5 | 5.0 | 3.9 | 3.7 |
| Elongation at break (%) | 1,300 | 1,350 | 990 | 1,300 | 1,290 |
| H/V | 6 | 6 | 3 | 6 | 6 |
| Airtightness (kPa) | 75 | 75 | 20 | 70 | 65 |
| Scott type crease-flex test | pass | pass | pass | reject | reject |

The invention claimed is:

1. An addition-curable silicone rubber composition comprising:
(A) 100 parts by weight of an organopolysiloxane having at least two silicon-bonded $C_2$-$C_8$ alkenyl groups per molecule,
(B) an organohydrogenpolysiloxane having at least two silicon-bonded hydrogen atoms per molecule, represented by the following formula (1):

[Chem. 1]

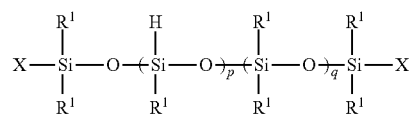

wherein $R^1$ is a $C_1$-$C_{12}$ monovalent hydrocarbon group, X is hydrogen or a group $R^1$, p is an integer of 1 to 50, q is an integer of 1 to 50, meeting 0.1≤p/(p+q)≤1, and at least one X is hydrogen when p is 1, in an amount to give at least 5 moles of silicon-bonded hydrogen atoms in component (B) per mole of alkenyl groups in component (A), (C) an addition reaction catalyst in an amount to give 1 to 500 ppm of catalyst metal element based on the total weight of components (A) and (B), (D) 0.1 to 50 parts by weight, per 100 parts by weight of the component (A), of finely divided silica having a BET specific surface area of at least 50 m$^2$/g, (E) 0.1 to 5.0 parts by weight, per 100 parts by weight of the component (A), of a tackifier which is a mixture of (E-1) 1 to 50% by weight of an organohydrogenpolysiloxane having the following formula (2):

[Chem. 2]

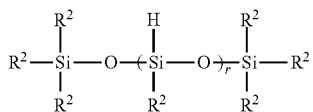

(2)

wherein $R^2$ is independently a $C_1$-$C_{12}$ monovalent hydrocarbon group and r is an integer of 5 to 50, (E-2) 1 to 50% by weight of an alkoxysilyl-modified isocyanurate compound having the following formula (3):

[Chem. 3]

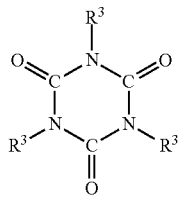

(3)

wherein $R^3$ is independently an allyl group or a group having the following formula (4):

[Chem. 4]

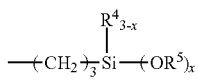

(4)

wherein $R^4$ is a $C_1$-$C_6$ monovalent hydrocarbon group, $R^5$ is a $C_1$-$C_4$ alkyl group, and x is 2 or 3, and at least two of $R^3$ are groups of formula (4), and (E-3) 40 to 90% by weight of an organosilicon compound having at least one epoxy group and at least one alkoxysilyl group per molecule and free of silicon-bonded hydrogen atoms, the total of components (E-1) to (E-3) being 100% by weight, and (F) 0.1 to 5.0 parts by weight, per 100 parts by weight of the component (A), of a condensation catalyst comprising at least one organometal compound selected from organotitanium and organozirconium compounds.

2. The addition-curable silicone rubber composition of claim 1 wherein component (A) comprises:

(A-1) an alkenyl-containing organopolysiloxane containing at least two silicon-bonded $C_2$-$C_8$ alkenyl groups per molecule and having a viscosity of at least 70,000 mPa·s at 25° C. as measured according to JIS Z-8803: 2011 and (A-2) an alkenyl-containing organopolysiloxane containing at least two silicon-bonded $C_2$-$C_8$ alkenyl groups per molecule and having a viscosity of 10,000 to 50,000 mPa·s at 25° C. as measured according to JIS Z-8803: 2011, in a weight ratio of component (A-1) to component (A-2) of from 10:90 to 90:10.

3. The addition-curable silicone rubber composition of claim 1 or 2 which cures under heat curing conditions of 150° C. and 5 minutes into a cured product having an elongation at break of at least 1,000% as measured according to JIS K-6249: 2003.

4. An airbag comprising a base fabric and a cured film of the addition-curable silicone rubber composition of claim 1 or 2 coated on the surface of the base fabric in a coating weight of 10 to 150 g/m$^2$.

5. The airbag of claim 4 which is used as a curtain airbag.

* * * * *